TRANSISTOR CHOPPER

Original Filed Aug. 15, 1957

INVENTOR.
GERALD M. FORD
BY
H. H. Losche
ATTORNEYS

United States Patent Office 3,011,117

Patented Nov. 28, 1961

3,011,117
TRANSISTOR CHOPPER

Gerald M. Ford, Santa Monica, Calif., assignor to the United States of America as represented by the Secretary of the Navy Original application Aug. 15, 1957, Ser. No. 678,459, now Patent No. 2,930,984, dated Mar. 29, 1960. Divided and this application May 28, 1959, Ser. No. 816,653
1 Claim. (Cl. 321—45)
(Granted under Title 35, U.S. Code (1952), sec. 266)

The invention described herein may be manufactured and used by or for the Government of the United States of America for governmental purposes without the payment of any royalties thereon or therefor.

This application is a division of my application, Serial No. 678,459, filed August 15, 1957, now United States Patent No. 2,930,984, granted March 29, 1960, and relates generally to choppers for producing an alternating current (A.C.) output and particularly to choppers incorporating semiconductors as switching means.

Ordinarily, the elements utilized in choppers for changing direct current (D.C.) input signal into an A.C. voltage have been electromagnetically actuated mechanical vibrators, or switches, operated from a source of A.C. reference voltage. Numerous difficulties are associated with use of such apparatus. For example, the inertia of the vibrating element of these units is such that any change in their operating frequency necessarily introduces a corresponding shift in the phase of the output signal, thereby excluding their applicability in systems where the operating frequency is subject to variation. Moreover, electromagnetically actuated switches also have low reliability factors as the result of mechanical wear and the degeneration of electrical contacts. In various efforts to avoid the aforestated disadvantages of the prior art some choppers have been developed which use semiconductor switching elements in the chopper. However, these have in most cases been limited to units which can accommodate a direct current input having only one polarity and are inoperative if a direct current of the opposite polarity is applied to the input. Prior to the present invention, the only choppers which could use an input of either polarity were rather complicated and required a minimum of two transistors.

The novel chopper of this invention comprises a voltage divider network coupled between a source D.C. input signal of either polarity and a ground source of constant reference potential, a semiconductor switch having a bidirectionally conductive path coupled in parallel with at least a portion of the voltage divider, and a source of A.C. potential for closing and opening the switch alternately and repetitively, thereby effectively bypassing the parallel coupled portion of the voltage divider each time the switch is closed such that the unidirectional potential across the switch is caused to fluctuate at the switch operating frequency. The fluctuating output potential may be changed to an A.C. voltage by passing it through a coupling capacitor, thereby eliminating its D.C. component.

The objects of the invention are as follows:

(1) To provide a novel chopper.

(2) To provide an inertialess, variable frequency, reliable, economical, small, and light weight chopper.

(3) To provide a chopper wherein a semiconductor is utilized as a switching element.

(4) To provide a chopper utilizing a single semiconductor which chopper is operative with a direct current input of either polarity.

(5) To provide an electronic chopper comprising a transistor having a bidirectionally conductive path coupled in parallel with a portion of a voltage divider coupled across the source of the D.C. input signal, and a source of A.C. reference voltage coupled to a current controlling electrode of the transistor such that the bidirectionally conductive path is interrupted and closed alternately at the frequency of the A.C. reference voltage.

It is probable that additional objects and features of the invention as well as a variety of uses therefor will become apparent after studying the following detailed description in conjunction with the accompanying drawings wherein.

As is well understood in the art, a transistor is a semiconductive body having a region of one conductivity type usually sandwiched between two regions of the opposite conductivity type. A large area metallic connection to the middle region is called the base electrode while similar connections to the end regions are called the emitter and collector electrodes, respectively. A unique characteristic of certain transistors which makes them especially useful for switching purposes is their capacity to conduct current in either direction between the two end regions, depending, of course, upon the polarity of the bias potentials applied thereto. The middle region of the transistor, for example, may function as a switch blade. Thus, when a potential having the polarity normally required to interrupt the conductive path between the emitter and collector is applied to the base of the transistor, and the magnitude of this potential is greater than the magnitude of the greatest potential of the same polarity applied either to the emitter or collector, conduction through the transistor ceases, thereby effectively opening the switch. Conversely, whenever the magnitude of the base potential drops below that of a potential of the same polarity applied to the collector or emitter, or whenever a potential of the opposite polarity is applied to the base, the conduction through the transistor is restored, thereby effectively closing the switch i.e., if a potential is applied to the base having a polarity and magnitude such that either of the emitter-to-base or the collector-to-base diode junctions of the transistor is biased in a forward direction, the transistor switch will be placed in a closed condition (conducting), but if the potential applied to the base causes both of these junctions to be reverse biased, the switch will be open (nonconducting). The present invention exploits this feature of the transistor to the utmost.

Figure 1:
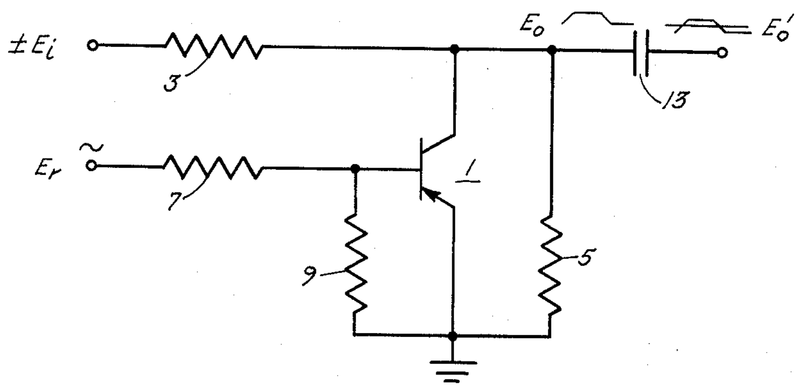
FIG. 1 represents an embodiment of the novel chopper of this invention.

The embodiment of the novel chopper represented in FIG. 1 comprises a transistor 1 of the P-N-P type having its collector electrode coupled to a point common to series connected resistors 3 and 5, its emitter electrode coupled to a ground source of constant potential, and its base electrode coupled to a point common to series connected resistors 7 and 9. The series connected resistors 3 and 5 form a first voltage divider between a source of D.C. input signal $\pm E_1$ and a ground source of constant reference potential, and series connected resistors 7 and 9 form a second voltage divider between a source of A.C. reference voltage $E_r$ and the ground source of constant potential. The output voltage $E_o$ fluctuating at the frequency of A.C. reference voltage $E_r$ is derived from the collector electrode of transistor 1.

Figure 2:
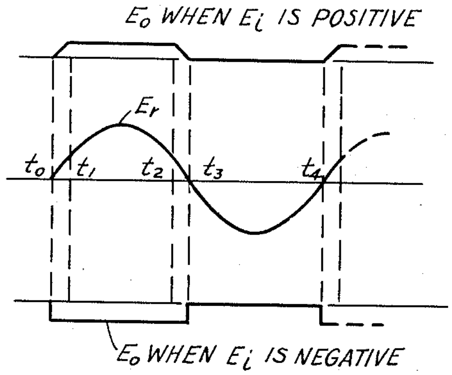
FIG. 2 represents reference voltage and output waveforms for the embodiment of FIG. 1.

The transistor 1 functions as a switch in response to the portion of the A.C. reference voltage tapped from the voltage divider 7—9 and applied to its base electrode. As represented in FIG. 2, the transistor switch 1 is open during positive half cycles of the A.C. reference voltage $E_r$ and is closed during negative half cycles. Assume first that the D.C. input signal $E_1$ is positive. When this condition exists, the output signal $E_o$, represented by the upper waveform of FIG. 2, has sloping sides, indicating that transistor switch 1 is closed during the initial and ending portions of the positive half cycles of A.C. reference voltage $E_r$. Prior to time $t_0$ the transistor switch 1 is closed and electron current sufficient to reduce the potential on the collector electrode to that of the emitter flows in the inverse direction through transistor switch 1. When this condition exists, the output signal $E_o$ remains constant at approximately the level of the ground source of constant potential. Consequently, the collector potential does not begin to change until time $t_0$ when the A.C. reference voltage $E_r$ is beginning a positive half cycle and the rising positive potential of $E_r$ begins to attenuate the flow of electron current through the transistor switch 1.

As represented in FIG. 2, the effect of the rise of reference voltage $E_r$ during the time interval $t_0$ to $t_1$ is to attenuate the flow of electron current through transistor switch 1 such that a corresponding rise in potential occurs on its collector electrode. At time $t_1$ the amplitude of the positive half cycle of $E_r$ becomes great enough to cause transistor switch 1 to open, thereby disrupting the flow of electron current therethrough. The transistor switch 1 remains open during the time interval $t_1$ to $t_2$. During this interval the output voltage $E_o$ remains at the magnitude established by the voltage divider 3—5 coupled between the source of D.C. input signal $\pm E_i$ and the ground source of constant potential.

At time $t_2$ the amplitude of A.C. reference voltage $E_r$ again has become less positive than the potential present on the collector electrode, such that electron current once more begins to flow from the emitter to the collector. As reference voltage $E_r$ diminishes during time interval $t_2$ to $t_3$, the flow of electron current increases until, at time $t_3$, its magnitude has become great enough to make the potential on the collector electrode equal to that of the ground source of constant reference potential applied to the emitter electrode. At this instant, the output signal $E_o$ reaches its minimum level.

During the time interval $t_3$ to $t_4$, the negative half cycle of $E_r$ is present on the base electrode of transistor switch 1, the switch remains in its closed condition, a constant flow of electron current is passing therethrough in the inverse direction, and the magnitude of the output signal $E_o$ remains constant at its minimum value. At time $t_4$ another positive half cycle reference voltage $E_r$ begins and the cycle is repeated.

When the polarity of the D.C. input signal $E_i$ is negative, the waveform of the resulting output signal $E_o$ is represented in the lower curve of FIG. 2. At time $t_0$ a positive half cycle of A.C. reference voltage $E_r$ begins, causing transistor switch 1 to open abruptly. During the entire positive half cycle of $E_r$ the transistor switch 1 remains open and no electron current flows therethrough. Accordingly, the magnitude of the negative output signal $E_o$ is established by the magnitude of the D.C. input signal $-E_i$ and the voltage divider 3—5 across which it is coupled.

At time $t_3$ a negative half cycle of A.C. reference voltage $E_r$ begins. Inasmuch as the potential present on the collector electrode of transistor switch 1 is negative at this instant, the effect of the negative going voltage derived from $E_r$ and applied to the base electrode of transistor 1 is to cause the switch to close abruptly, thereby initiating electron current flow in the normal direction from collector to emitter. This flow of electrons abruptly causes the potential on the collector electrode to rise to the level of that present on the emitter electrode. Inasmuch as emitter and collector potentials are equal, no further increase in electron current flow occurs and the magnitude of the output signal $E_o$ remains constant at the level of ground potential until the negative half cycle ends at time $t_4$. At this instant another positive half cycle of $E_r$ begins and the aforedescribed cycle of operation is repeated.

In the aforedescribed manner, the output signal $E_o$ is caused to fluctuate between maximum and minimum levels. In an application where an A.C. output signal $E_o'$ is desired, a coupling capacitor, such as shown at 13 in FIG. 1, may be utilized to eliminate the D.C. component of the fluctuating potential developed on the collector electrode of transistor switch 1.

Although the transistor 1, represented in FIG. 1, is of the P-N-P type, it should be noted that a transistor of the N-P-N type could be used equally well. Notwithstanding the type utilized, a transistor will function effectively as an electron switch if coupled in the common collector configuration instead of the common emitter configuration as shown in FIG. 1.

It should be noted that the A.C. output signal $E_o'$ always will be in phase, or one hundred eighty degrees out of phase, with the A.C. reference voltage $E_r$.

The details illustrated in the accompanying drawings and set forth in the foregoing description are intended merely to facilitate the practice of the invention by persons skilled in the art. The scope of the invention is represented in the following claim.

What is claimed is:

A voltage conversion circuit for converting a direct current input signal into an alternating current output signal comprising: a single bidirectionally conducting junction transistor means having base, collector, and emitter conduction electrodes; a first resistance having one end coupled to a first input terminal means, for receiving a variable magnitude direct current input signal of either polarity, and having the other end coupled to a first common junction point; a second resistance having one end coupled to said first common junction point, and having the other end coupled to ground potential, said first and second resistances forming a first voltage divider network; a third resistance having one end coupled to a second input terminal means, for receiving an alternating current reference control voltage, and having the other end coupled to a second common junction point; a fourth resistance having one end coupled to said second common junction point, and having the other end coupled to ground potential, said third and fourth resistances forming a second voltage divider network; said transistor means having its base electrode coupled to said second common junction point, its collector electrode coupled to said first common junction point, and its emitter electrode coupled to a source of ground potential; and a direct current blocking capacitance having one end coupled to said first common junction point and having the other end coupled to an output terminal means for supplying an alternating current output signal having an amplitude representative of the magnitude of said direct current input signal, and having a phase relationship, with respect to said alternating current reference control voltage, indicative of the polarity of said direct current input signal.

References Cited in the file of this patent

UNITED STATES PATENTS

| | | |
|---|---|---|
| 2,555,305 | Alty | June 5, 1951 |
| 2,667,614 | Covill | Jan. 26, 1954 |
| 2,668,940 | McNaney | Feb. 9, 1954 |
| 2,826,696 | Suran | Mar. 11, 1958 |
| 2,866,909 | Trousdale | Dec. 30, 1958 |
| 2,926,296 | Pinckaers | Feb. 23, 1960 |
| 2,953,738 | Bright | Sept. 20, 1960 |

OTHER REFERENCES

"A Transistor D.C. Chopper Amplifier," by P. L. Burton, published by Electronic Engineering (August 1957), pages 393–397 relied on.